July 30, 1929.
E. B. FUNSTON
1,722,960
WATER DELIVERY DEVICE
Filed Oct. 6, 1924
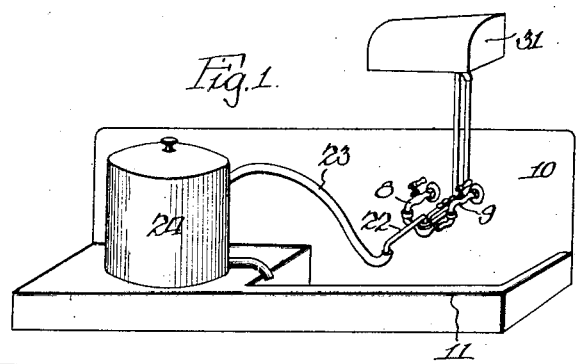
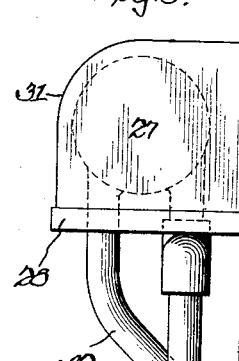
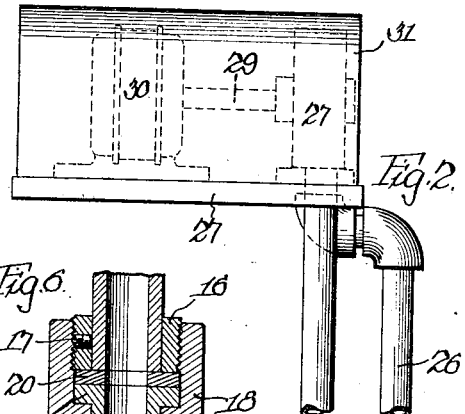
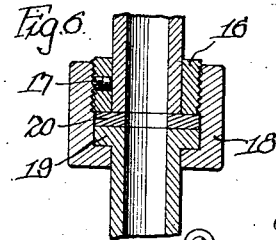
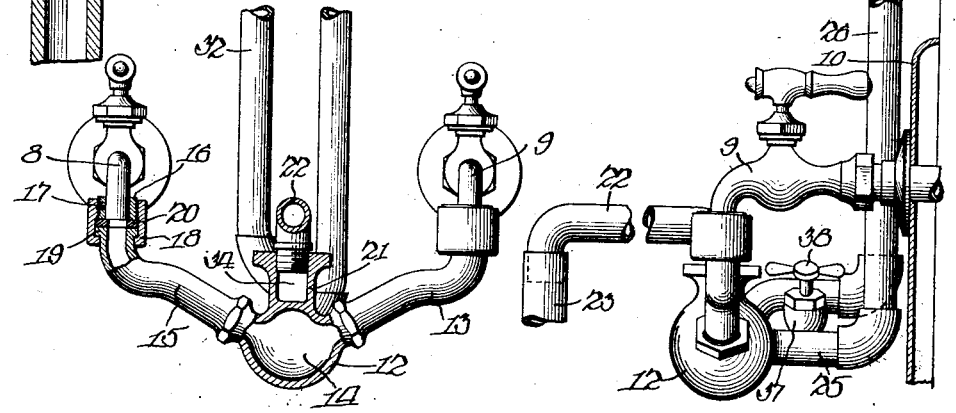
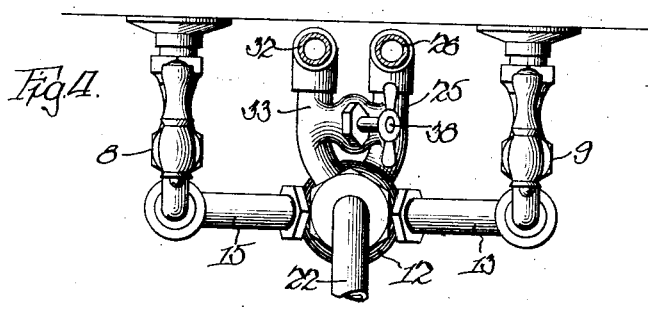
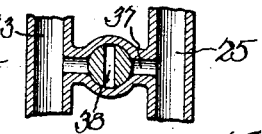
Inventor
Edmund B Funston
By Fred Gerlach
His Atty.

Patented July 30, 1929.

1,722,960

UNITED STATES PATENT OFFICE.

EDMUND B. FUNSTON, OF RACINE, WISCONSIN, ASSIGNOR TO GEORGE W. FUNSTON, OF CHAMPAIGN, ILLINOIS.

WATER-DELIVERY DEVICE.

Application filed October 6, 1924. Serial No. 741,793.

The invention relates to water delivery devices adapted for connection with the usual hot and cold water supply faucets.

In the operation of dish-washing or other machines which are designed to be operated by water under pressure and in which pressure of a predetermined minimum is necessary to operate the machine, and jets are employed to rotate and cleanse the dishes, a drop in pressure, such as frequently or occasionally occurs in a supply main, will prevent the machine from functioning properly or efficiently. A desideratum in machines of this character is to operate them from water under the pressure in which it is delivered from the supply main, to dispense with the necessity of the use of auxiliary means to produce the necessary water pressure at the jets of these machines. In practice, it has been found, however, that the pressure in water systems fluctuates, for example at the faucets in upper story apartments, so that there are periods when the pressure of the water will not be sufficient for the efficient operation of the dish-washing machine.

One object of the present invention is to provide suitable means for meeting these conditions by providing a pump which is adapted to be connected to a fitting attachable to the hot and cold water faucets, so that it may, at will, be used to increase the water pressure between the supply faucets and the machine whenever the pressure at the faucets falls below the minimum necessary to cause the dishwasher to function properly or efficiently. This object is attained primarily by providing connections and fittings which are attachable to the hot and cold water faucets and by which the water to the washer may be controlled to pass to the pump when necessary or to by-pass the pump when the pressure in the supply main is sufficient to cause the dish-washer to function. Other objects will appear from the detail description.

The invention consists in the several novel features hereinafter set forth and more particularly defined by the claim at the conclusion hereof.

In the drawings: Fig. 1 is a perspective of a water supply system embodying the invention. Fig. 2 is a front elevation, parts being shown in section. Fig. 3 is a side elevation. Fig. 4 is a plan. Fig. 5 is a section through the by-pass valve, between the inlet and outlet pipes. Fig. 6 is a detail of one of the couplings between the fitting and a faucet. Fig. 7 is a modification, showing a hand-operated pump for use where electric current is not available.

The invention is exemplified as applied to the usual hot water faucet 8 and cold water faucet 9, which are connected to receive water under the pressure prevailing in the supply-main. These faucets are usually mounted at the back 10 of a sink 11 of usual construction. Each of these faucets is provided with a suitable handle for controlling the discharge of water therefrom. Fittings and connections are provided for delivering either hot or cold water and for mixing the same to deliver tempered water, when desired. A mixing and delivery fitting comprising a body 12, a branch pipe 13, leading from a mixing chamber 14 in said body to the cold water faucet 9, and a branch 15, leading from the hot water faucet 8 to said chamber is provided for this purpose. Each of the branches 13 and 15 is adapted to be removably attached to an installed faucet of usual construction by means of a ring 16 which is secured to the terminal of the faucet by a countersunk screw 17 and is provided with an external thread to receive an internally threaded-coupling ring 18 which, at one end, is formed to engage an annular shoulder 19 on the branch-pipe to clamp an elastic washer 20 between the contiguous ends of the branch-pipe and the faucet. The body 12 is also provided with an upwardly extending member 21, to which is connected a delivery pipe 22 which is pivotally held therein so that it may swing laterally into any desired position over the sink. This pipe 22 may be connected by a suitable hose connection 23 to a dish-washer 24, or other machine to be operated by water from the fitting.

The fitting-body 12 is provided with a rearwardly extending outlet branch 25. An upright pipe 26 is connected to said branch and conducts water from the mixing chamber 14 to the inlet side of a rotary pump 27, which may be of any well known and suitable construction. This pump is mounted on a shelf 28, which is conveniently secured in any suitable manner to the wall above and back of the sink, and may be driven by the shaft 29 of an electric motor 30, which is also mounted on the shelf and may, together with the pump, be enclosed by a housing 31, if desired. Where electric current is not available or its use is not desired, a pump adapted to be driven by a handle 30ª and gears 30ᵇ, 30ᶜ, as shown in Fig. 7, may be used. A pipe 32 leads downwardly from the discharge side of the pump 27 and is connected to a branch 33 of the fitting-body 12. The mixing chamber 14 in said body, into which water may be discharged from either or both faucets, is in communication with branch 25 to permit water to flow from said chamber to the pump. Branch 33 is in communication with a duct 34 in member 21 of body 12, which is separated from the mixing-chamber 14, to conduct water from the pump to the delivery pipe 22, which is in constant communication with the duct 34. A by-pass port 37 is provided between branches 25 and 33. A valve 38 controls said port, so that communication between the branches 25, 33, may be cut off when the pump is to be used and may be established to permit the water from the mixing chamber and branch 25 to flow directly to the branch 33 and thence through duct 34 to the discharge arm 22, whenever the use of the pump is unnecessary.

The operation of the invention is as follows: When the pressure in the supply system is sufficient to cause the water from the faucets 10 and 11 or either of them to properly perform its function in the dish-washer 24, valve 38 will be opened to permit the water to pass directly from the mixing-chamber 14 to the outlet duct 34 through branch 25, duct 37 and branch 33 and thence to the delivery pipe 22 to the hose connection, to the washer. When, however, the pressure in the water-supply falls below the minimum necessary to cause the water to function properly in the dish washer, the valve 38 will be closed and the rotary pump 27 will be driven to deliver the water to the delivery pipe 22 and force it into the washer under the necessary pressure. Water from the faucets 10 and 11 will pass through the chamber 14, branch 25 and pipe 26 to the pump, which will discharge it under the desired pressure through pipe 32, branch 33, duct 34 to the swivel delivery pipe 22.

The invention thus exemplifies a system for increasing the pressure of the water from the faucets 10 and 11 whenever the pressure of the water from the faucets is insufficient to function for its intended purpose. The invention also exemplifies a construction which is adapted to be readily attached to installed faucets of usual construction and which is independent of the dishwashing or other machine to which the water is to be delivered under pressure.

The invention is not to be understood as restricted to the details set forth, since these may be modified within the scope of the appended claim, without departing from the spirit and scope of the invention.

Having thus described the invention, what I claim as new and desire to secure by Letters Patent, is:

In a structure for supplying water to a washing machine or like apparatus, the combination of a fitting having formed therein a mixing chamber and an outlet duct, said fitting being provided with branches for connection to a plurality of water faucets, a delivery pipe connected to said outlet duct and adapted to be connected to the machine, a pump for putting the water under pressure, a pipe extending between and connecting the mixing chamber and the inlet of the pump, a pipe extending between and connecting the outlet of the pump and said duct, a cross pipe between said pipes for permitting the water to flow directly from one pipe into the other, and a valve for controlling said cross pipe.

Signed at Chicago, Illinois, this 13th day of September, 1924.

EDMUND B. FUNSTON.